(12) United States Patent
Ogura et al.

(10) Patent No.: US 6,295,141 B1
(45) Date of Patent: *Sep. 25, 2001

(54) IMAGE READING APPARATUS

(75) Inventors: Makoto Ogura, Sagamihara; Kenji Nagata, Kawasaki; Tatsundo Kawai, Hadano; Oji Saito; Satoshi Itabashi, both of Chigasaki; Masami Tabata, Isehara, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/063,097

(22) Filed: Apr. 20, 1998

(30) Foreign Application Priority Data

Apr. 25, 1997 (JP) ................................ 9-109272

(51) Int. Cl.$^7$ .................................................. H04N 1/04
(52) U.S. Cl. .......................... 358/475; 358/484; 358/509
(58) Field of Search .................... 358/475, 482, 358/483, 509, 484, 513, 514, 400, 471, 500, 501, 401, 496, 494, 497; 250/208.1; 362/800

(56) References Cited

U.S. PATENT DOCUMENTS

| | | | |
|---|---|---|---|
| 4,581,657 | * 4/1986 | Takano | 358/482 |
| 5,136,150 | 8/1992 | Fukushima et al. | 250/208.1 |
| 5,142,137 | * 8/1992 | Kushino et al. | 250/208.1 |
| 5,182,445 | * 1/1993 | Yamashita | 250/208.1 |
| 5,187,595 | * 2/1993 | Kitani et al. | 358/482 |
| 5,198,655 | * 3/1993 | Suetsugu et al. | 250/208.1 |
| 5,434,682 | * 7/1995 | Imamura et al. | 358/474 |
| 5,579,114 | 11/1996 | Imamura | 358/482 |
| 5,780,840 | * 7/1998 | Lee et al. | 250/208.1 |
| 5,859,421 | * 1/1999 | Onishi et al. | 250/208.1 |
| 5,949,062 | * 9/1999 | Matsumoto | 250/208.1 |
| 6,055,072 | * 4/2000 | Tabata et al. | 358/475 |
| 6,115,187 | * 9/2000 | Tabata et al. | 358/509 |

FOREIGN PATENT DOCUMENTS 0520430  12/1992 (EP) .
0557891   9/1993 (EP) .

* cited by examiner

Primary Examiner—Cheukfan Lee
(74) Attorney, Agent, or Firm—Robin, Blecker & Daley

(57) ABSTRACT

An image reading apparatus having a light guide unit with a light source for applying light to an image reading surface, and a board provided with a photoelectrical conversion element for photoelectrically converting light reflected from the image reading surface into an electrical signal, wherein the light guide unit is supported by the board by making the light guide unit in contact with the board.

64 Claims, 13 Drawing Sheets

FULL CONTACT

FULL CONTACT

FULL CONTACT

IMAGE READING APPARATUS

BACKGROUND OF THE INVENTION

1. Field of the Invention

The present invention relates to an image reading apparatus and an information processing apparatus using the image reading apparatus, and more particularly to an image reading apparatus having a light source with a light guide (hereinafter called a "light guide unit") for guiding light to an image reading surface and a base unit for photoelectrically converting light reflected from the image reading surface into an electrical signal.

2. Related Background Art

Conventionally, an image reading apparatus having the structure such as shown in FIGS. 17 and 18 has been used with an information processing apparatus such as a facsimile apparatus and an electronic copying machine. FIG. 17 is a cross sectional view of a conventional image reading apparatus, and FIG. 18 is a broken perspective view of the image reading apparatus.

Referring to FIGS. 17 and 18, reference numeral 21 represents a sensor array having a length corresponding to that of an original to be read, reference numeral 22 represents a sensor array board on which the sensor array 21 is mounted, reference numeral 23 represents a focussing element for focussing light reflected from an original surface onto a light reception surface of the sensor array 21, reference numeral 25 represents a transparent member in contact with the original surface, and reference numeral 24 represents a light guide for guiding light radiated from a light source 27 such as LED disposed on the side at one end of the light guide unit toward the original surface. Reference numeral 26 represents a frame on which, as shown in FIG. 18, the focussing element 23, light source 27 and light guide 24 are mounted and thereafter the transparent member 25 is mounted on one side of the frame 26 and the sensor array board 22 is mounted on the other side thereof.

In the image reading apparatus constructed as above, in order to make light guided by the light guide unit 24 and reflected from the original surface be correctly incident via the focussing element 23 upon the light reception surface of the sensor array 21, it is necessary to mount the sensor array board 22, focussing element 23, light projector 24 and the like with high precision.

With the image reading apparatus constructed as above, however, a mount precision of each component varies also with a precision of the frame 26 itself on which each component is mounted. It has been desired therefore to form the frame 26 with high work precision of dimensions and suppress variations of dimensions.

SUMMARY OF THE INVENTION

It is an object of the present invention to provide an image reading apparatus capable of improving a mount precision of each component such as a board on which a photoelectrical conversion element is mounted, a light source and the like, and also facilitating an assembly work of the image reading apparatus, and to provide an information processing apparatus using such an image reading apparatus.

It is another object of the present invention to provide an image reading apparatus capable of reliably shielding external light other than light from the image reading surface, even if the apparatus is made compact.

According to one embodiment of the invention, an image reading apparatus is provided which comprises: a light guide unit with a light source for applying light to an image reading surface; and a board provided with a photoelectrical conversion element for photoelectrically converting light reflected from the image reading surface into an electrical signal, wherein the light guide unit is contacted with the board to thereby support the light guide unit by the board.

According to another embodiment of the invention, an information processing apparatus is provided which comprises: an image reader having a light guide unit with a light source for applying light to an image reading surface and a board provided with a photoelectrical conversion element for photoelectrically converting light reflected from the image reading surface into an electrical signal; and control means for controlling the image reader, wherein the light guide unit is in contact with the board to thereby support the light guide unit by the board.

With the above structure, therefore, a mount precision of the light guide unit and photoelectrical conversion element does not depend on a precision of an integral framing body and it can be improved further.

According to another embodiment of the invention, an image reading apparatus is provided which comprises: a light guide unit with a light source for applying light to an image reading surface; a board provided with a photoelectrical conversion element for photoelectrically converting light reflected from the image reading surface into an electrical signal; a frame for holding the light guide unit and the board; and a light shielding member for preventing light other than image information light reflected from the image reading surface from entering the photoelectrical conversion element, wherein the light shielding member is a discrete member different from the frame.

According to another embodiment of the invention, an information processing apparatus is provided which comprises: an image reader having a light guide unit with a light source for applying light to an image reading surface, a board provided with a photoelectrical conversion element for photoelectrically converting light reflected from the image reading surface into an electrical signal, a frame for holding the light guide unit and the board, and a light shielding member for preventing light other than image information light reflected from the image reading surface from entering the photoelectrical conversion element; and control means for controlling the image reader, wherein the light shielding member is a discrete member different from the frame.

With the above structure, therefore, even if the image reading apparatus is made compact, external light other than light from the image reading surface can be reliably shielded.

The other objects and features of the present invention will be become more apparent from the following detailed description of embodiments when read in conjunction with the accompanying drawings.

DETAILED DESCRIPTION OF THE PREFERRED EMBODIMENTS

Embodiments of the invention will be described with reference to the accompanying drawings.

Figure 1:
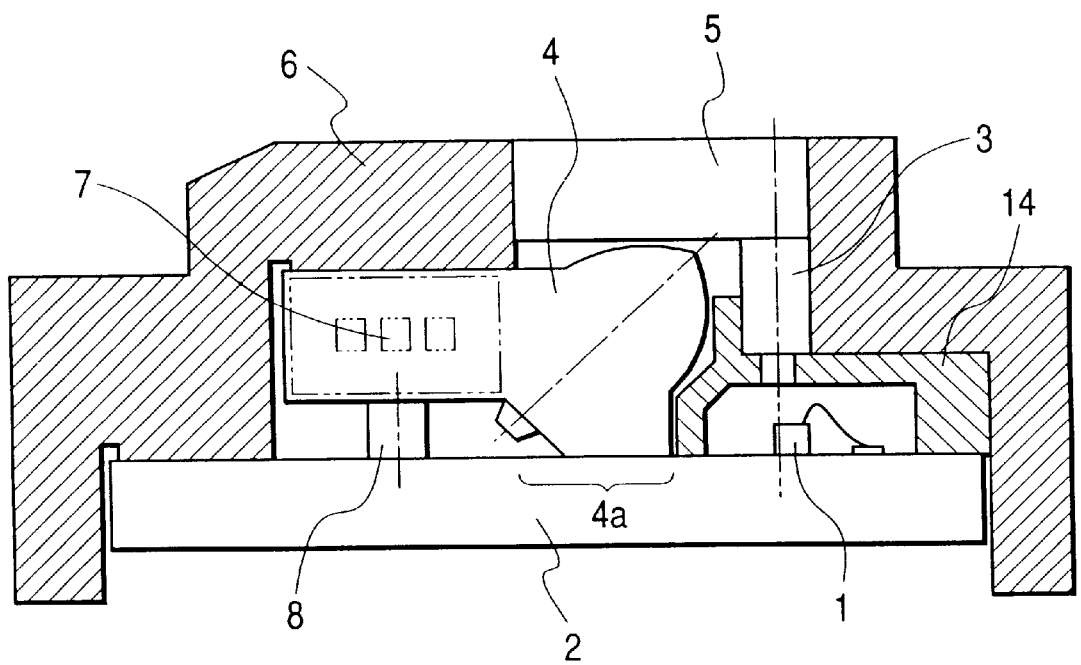
FIG. 1 is a cross sectional view showing the structure of an image reading apparatus according to a first embodiment of the invention.
Figure 2:
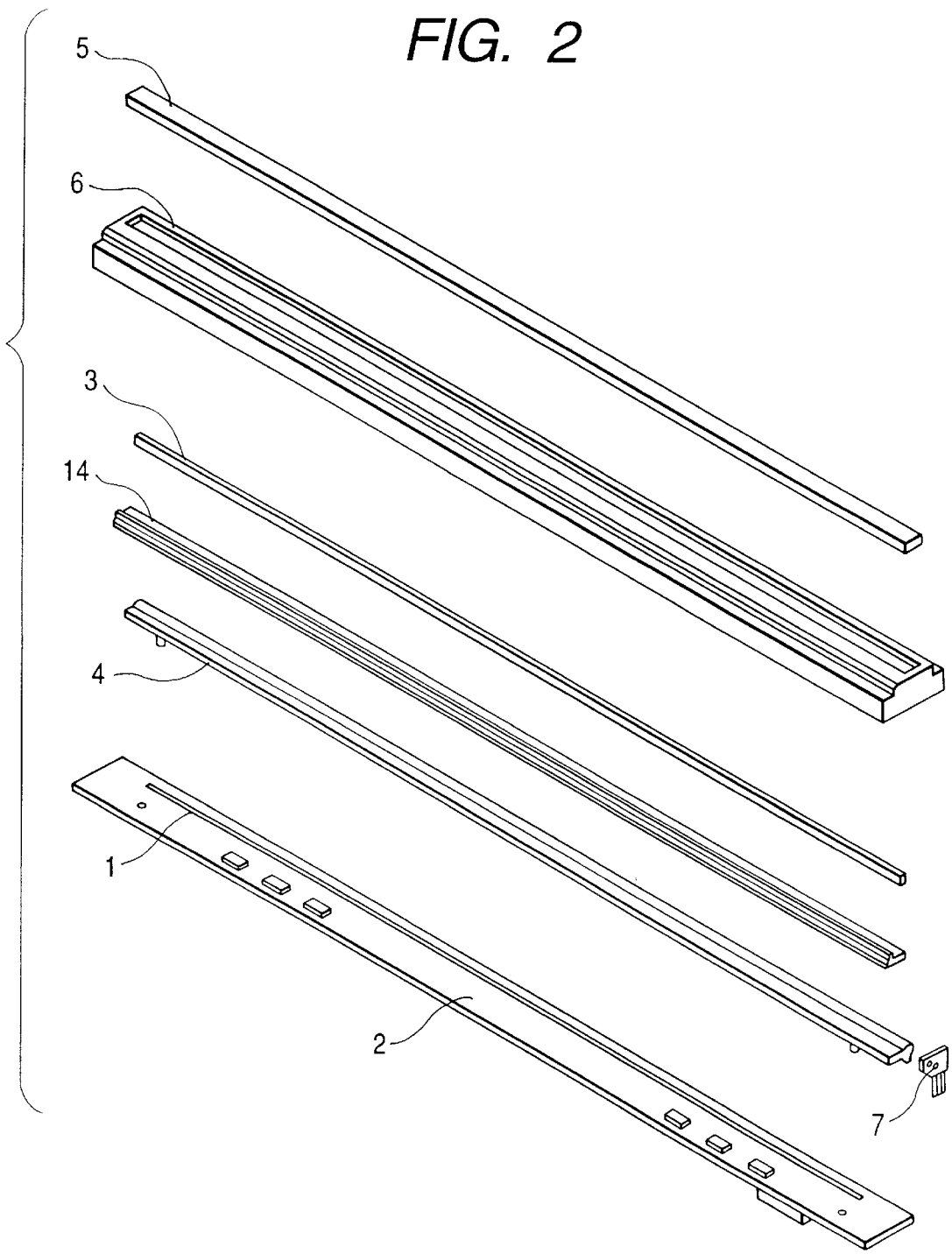
FIG. 2 is a broken perspective view showing the structure of the image reading apparatus of the first embodiment.

FIG. 1 is a cross sectional view showing the structure of an image reading apparatus according to the first embodiment of the invention, and FIG. 2 is a broken perspective view of the image reading apparatus shown in FIG. 1.

Referring to FIGS. 1 and 2, reference numeral 1 represents a sensor array (photoelectrical conversion unit) having a length corresponding to that of an original to be read, reference numeral 2 represents a sensor array board on which the sensor array 1 is mounted, reference numeral 3 represents a focussing element for focussing light reflected from an original surface onto a light reception surface of the sensor array 1, reference numeral 5 represents a transparent member in contact with the original surface, and reference numeral 4 represents a light guide for guiding light radiated from a light source 7 toward the original surface. The light source 7 is constituted of LEDs of three colors R (red), G (green) and B (blue). When a color image is to be read, these LEDs are selectively turned on. Light radiated from the light source 7 is incident upon the face at one end of the light guide 4, reflected (or repetitively reflected) by the inner surface of the light guide 4, and is irradiated from a lens-shaped light radiation surface of the light guide 4 toward the original surface. Reference numeral 6 represents a frame on which various components of the image reading apparatus described above are mounted. IC chips for processing signals photoelectrically converted by the sensor array 1 are mounted on the sensor array board 1 as many as necessary.

Reference numeral 14 represents a light shielding member which has a function of preventing external light other than light containing image information from entering the sensor array 1, and a function of fixing the focussing element 4 by squeezing it by the light shielding member 14 and frame 6. The focussing element 3 may be fixed to the frame 6 by using adhesive agent or a tape with its both sides being coated with adhesive agent. In this case, the end portion of the shielding member 14 for squeezing the focussing element 3 with the frame 6 may not be provided.

Figure 17:
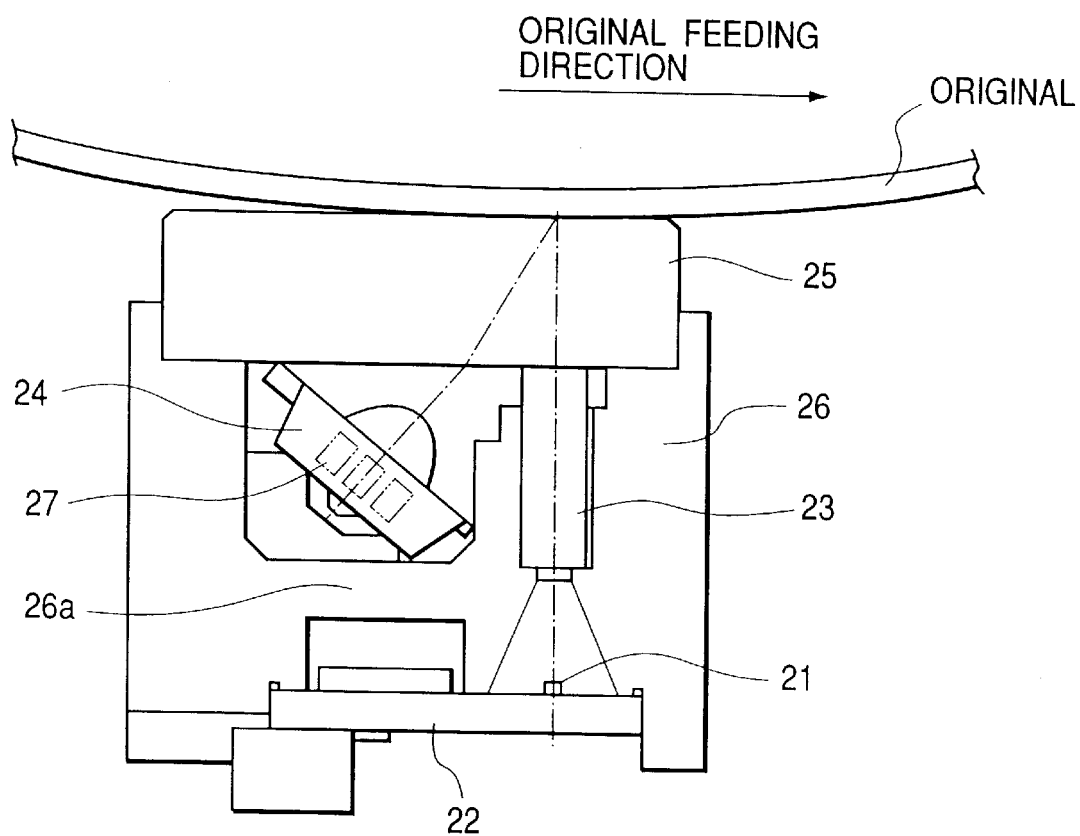
FIG. 17 is a cross sectional view of a conventional image reading apparatus.
Figure 18:
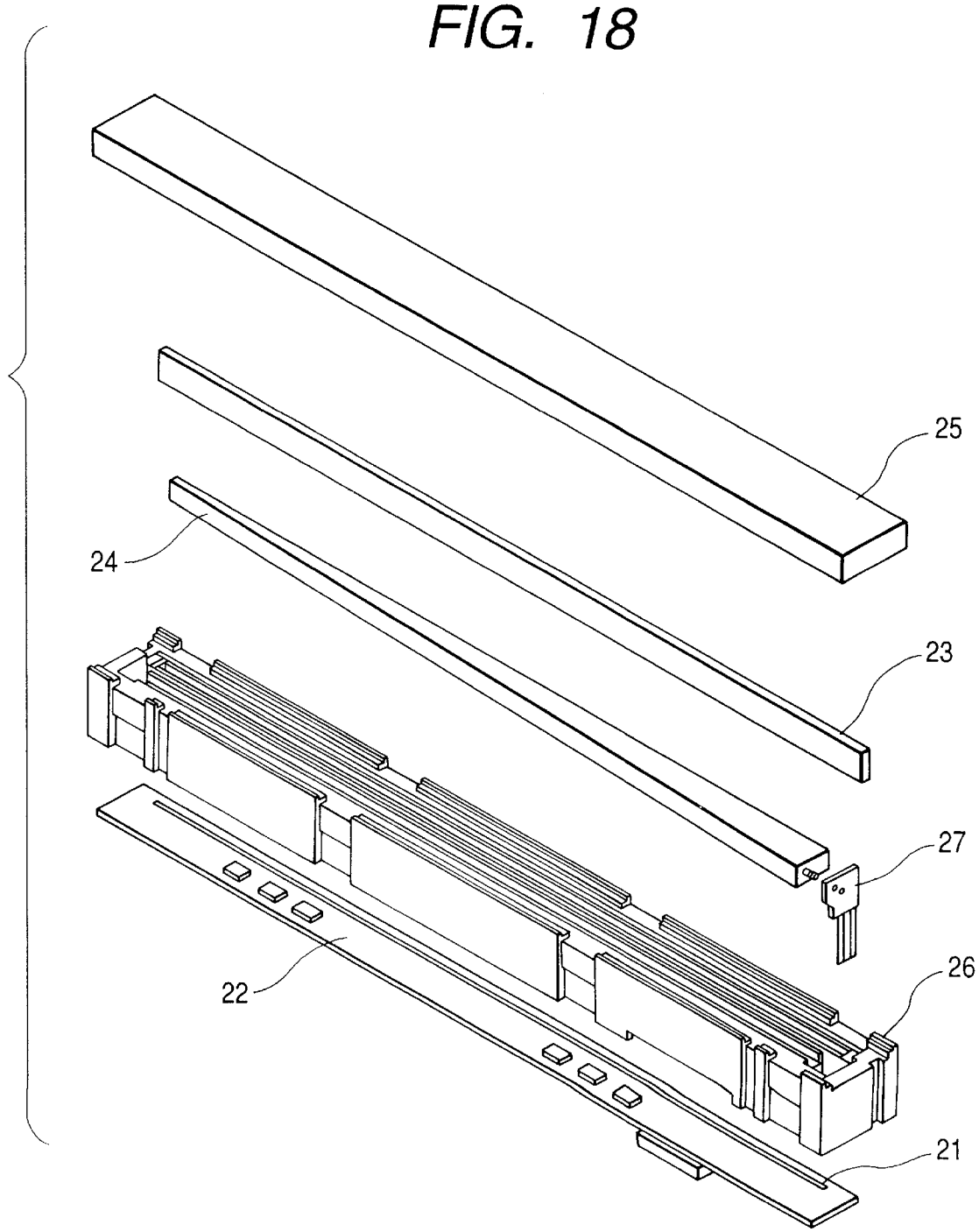
FIG. 18 is a broken perspective view of the conventional image reading apparatus.

In a conventional image reading apparatus such as shown in FIG. 17, the frame is used partially as the light shielding member. However, in this case, as the image reading apparatus is made more compact, a distance between the light shielding member and sensor array becomes shorter and the thickness of the frame portion functioning as the light shielding member becomes thinner. It is therefore preferable to provide the shielding member separated from the frame, as in this embodiment.

The reason of providing such a discrete light shielding member is as follows. The material of the frame is required to have a rigidity and a dimension stability both sufficient for the apparatus of the image reading apparatus and to have a small linear expansion relative to adhesion with glass as the material of components, whereas the material of the light shielding member is required to have a low transmissivity (high light shielding), a good molding performance, and a capability of being thinned. It is difficult to determine a material satisfying both the requirements and form an integral body of the frame and light shielding member.

The material of the frame used in this invention was polycarbonate resin, ABS resin, polyphenylene oxide (PPO) bulk molding compound (BMC) or the like mixed with glass fibers, carbon fibers or the like as reinforcing material. The material of the light shielding member used was polycarbonate resin, ABS resin, acrylic resin, vinyl chloride resin or the like without mixing reinforcing material.

The transparent member 5 and frame 6 are formed as an integrally molded component, and the upper surface thereof in contact with the original is made flat. The techniques of forming such an integrally molded frame are disclosed, for example, in Japanese Patent Laid-open Application No. 7-162587 (Japanese Patent Application No. 6-246197). The transparent member 5 made of glass or the like may be adhered to the frame The light source 7 and light guide 4 constitute a light guide unit. The light source 7 integrally formed with the light guide 4 may be mounted on the sensor array board 2, or they may be mounted separately on the sensor array board 2.

In this embodiment, the light guide 4 is provided with a projection 8 on the side of the sensor array board. This projection 8 abuts on the sensor array board 2 to support the light guide 4. A light radiation portion 4a of the light guide 4 is of a lens-shape for allowing light to be converged. Part of this portion is in contact with the sensor array board 2 to support the light guide 4. The light guide 4 is fixedly squeezed by the sensor array board 2 and frame 6.

Since the light guide 4 is directly mounted on the sensor array board 2, there is no frame portion (e.g., 26a in FIG. 17) which separates the light guide 4 from the sensor array board 2. Therefore, the height of the image reading apparatus can be lowered by using the focussing element 3 having a short focal length.

In the assembly sequence, the focussing element 3 is first mounted on the frame 3, and then the light shielding member 14, light guide 4 and sensor array board 2 are mounted. In this embodiment, the light guide 4 and sensor array substrate 2 can be mounted without being affected by a dimension precision of the frame 6, and the light guide 4 is mounted directly on the sensor array board 2. Therefore, a precision of the distance between the light shielding member 4 and sensor array 1 and a precision of an inclination of the light guide 4 relative to the sensor array board 2 can be improved.

Figure 7:
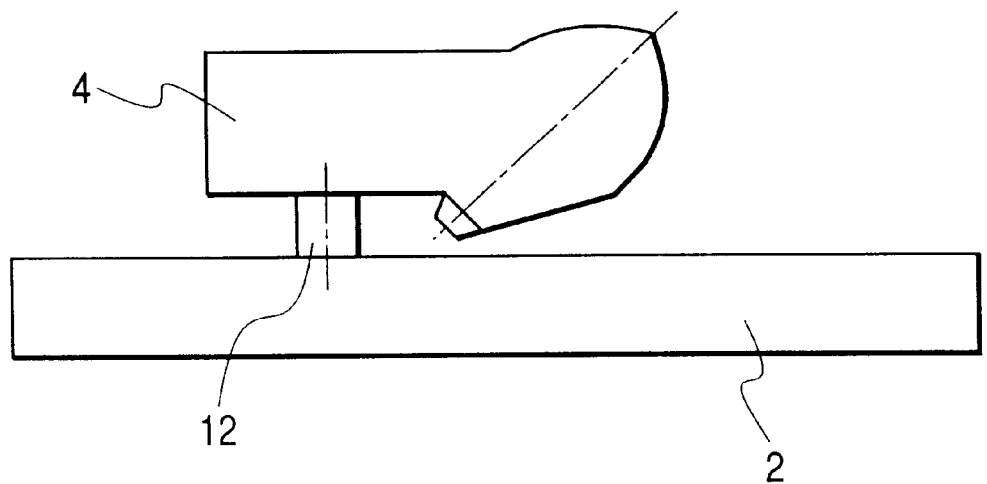
FIG. 7 is a cross sectional view partially showing the structure of an image reading apparatus according to a modification of the first embodiment.

The projection may be formed not on the side of the light guide 4 but on the side of the sensor array board 2, as shown in FIG. 7. The projection 12 shown in FIG. 7 is formed on the sensor array board 2.

Figure 3:
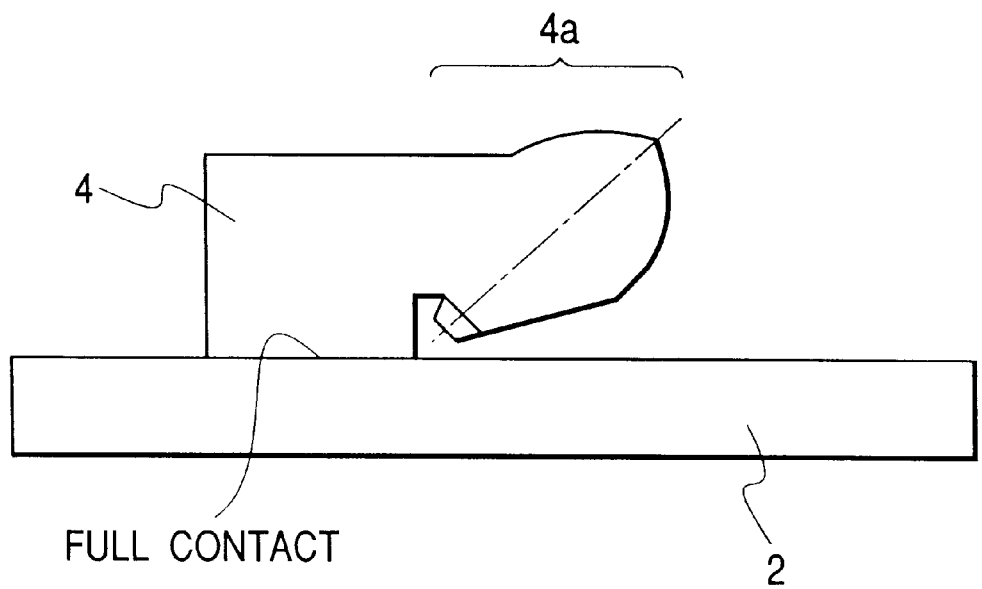
FIG. 3 is a cross sectional view partially showing the structure of an image reading apparatus according to a second embodiment of the invention.

FIG. 3 is a cross sectional view partially showing the structure of an image reading apparatus according to the second embodiment of the invention. The structure of the image reading system of the second embodiment is the same as that shown in FIG. 1, excepting the shape of the light guide. In FIG. 3, therefore, only the sensor array board and light guide are shown (also in the embodiments shown in FIGS. 4 to 9).

As shown in FIG. 3, in the second embodiment, a flat portion of the light guide 4 is in full contact with the sensor array board 2. Similar to the first embodiment, the light guide 4 is fixedly squeezed by the frame 6 (not shown) and sensor array board 2. In this embodiment as shown in FIG. 3, a lens-shape worked portion 4a of the light guide is not in direct contact with the sensor array board 2, so that a portion of the light guide of the first embodiment in directly contact with the sensor array board 2 can be worked to have a lens-shape.

Figure 4:
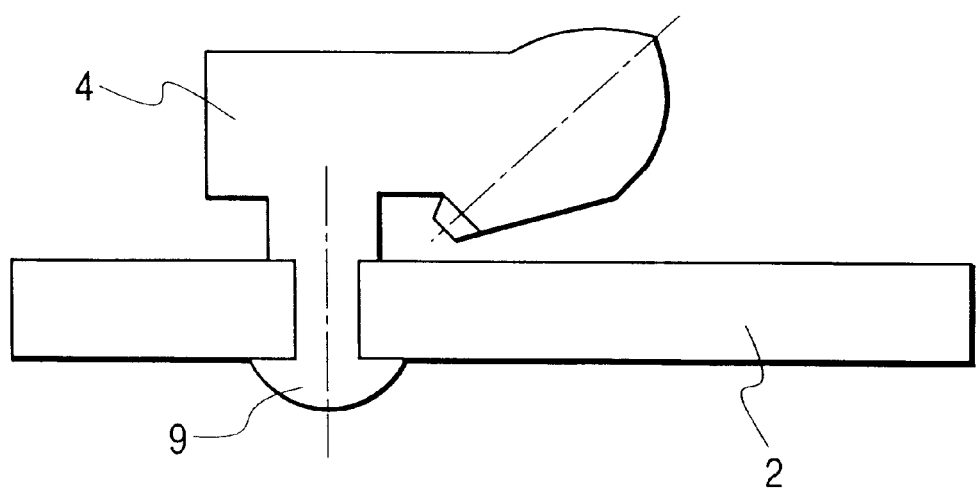
FIG. 4 is a cross sectional view partially showing the structure of an image reading apparatus according to a third embodiment of the invention.

FIG. 4 is a cross sectional view partially showing the structure of an image reading apparatus according to the third embodiment of the invention.

As shown in FIG. 4, in the third embodiment, the light guide 4 and sensor array board 2 are fixedly mounted together, and the relative position thereof is predefined. In this embodiment, the light guide 4 is partially formed with an extruding portion. The extruding portion is inserted into an opening of the sensor array board 2, and the end portion thereof is heated to form a caulk portion 9. Such a fixed mount is not limited only thereto, but other methods may be applied. For example, the extruded portion may be pressure-fitted in a recess formed on the surface of the sensor array board. The shape of the light guide may be changed to be suitable for a fixed mount, unless it does not degrade the performance of the light guide unit in converging and radiating light toward the original.

Figure 5:
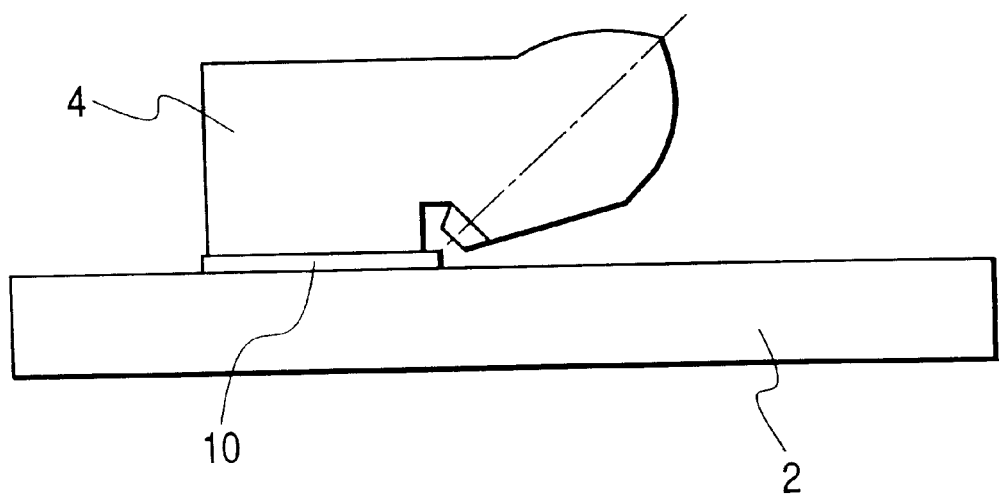
FIG. 5 is a cross sectional view partially showing the structure of an image reading apparatus according to a fourth embodiment of the invention.

FIG. 5 is a cross sectional view partially showing the structure of an image reading apparatus according to the fourth embodiment of the invention.

As shown in FIG. 5, in the fourth embodiment, in addition to the structure of the second embodiment, the light guide 4 is mounted via a spacer 10 on the sensor array board 2. This spacer 10 can be used for increasing a friction coefficient between the contact surfaces of the light guide and sensor array board, for increasing a reflectivity at the interface between light guide and sensor array board (by making the spacer 10 with material having a high reflectivity), for adjusting a variation of thicknesses of light guides, and for other purposes.

A relative position between the light guide 4 and sensor array board 2 can be fixed by using a tape with its both sides coated with adhesive as the spacer 10. The spacer may be used at positions of the projection 8 and light radiation portion 4a of the first embodiment.

Figure 6:
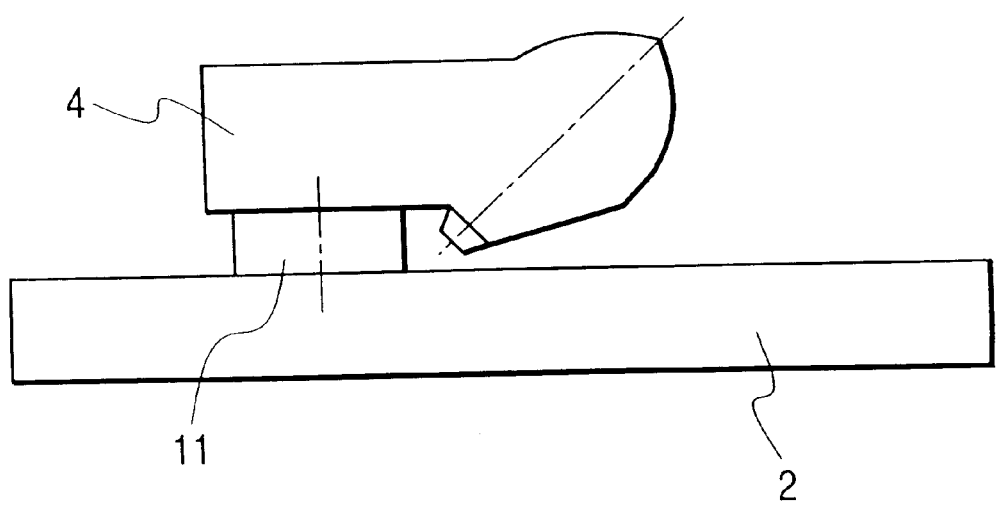
FIG. 6 is a cross sectional view partially showing the structure of an image reading apparatus according to a fifth embodiment of the invention.

FIG. 6 is a cross sectional view partially showing the structure of an image reading apparatus according to the fifth embodiment of the invention.

As shown in FIG. 6, in the fifth embodiment, as the spacer, an elastic member 11 made of rubber or the like is used. Use of the elastic member 11 can stably support the light guide 4. The elastic member 11 may be fixed to the sensor array board 2 by coating adhesive to one or both of the light guide 4 and sensor array board 2 or by using a tape with both surfaces coated with adhesive.

Figure 8:
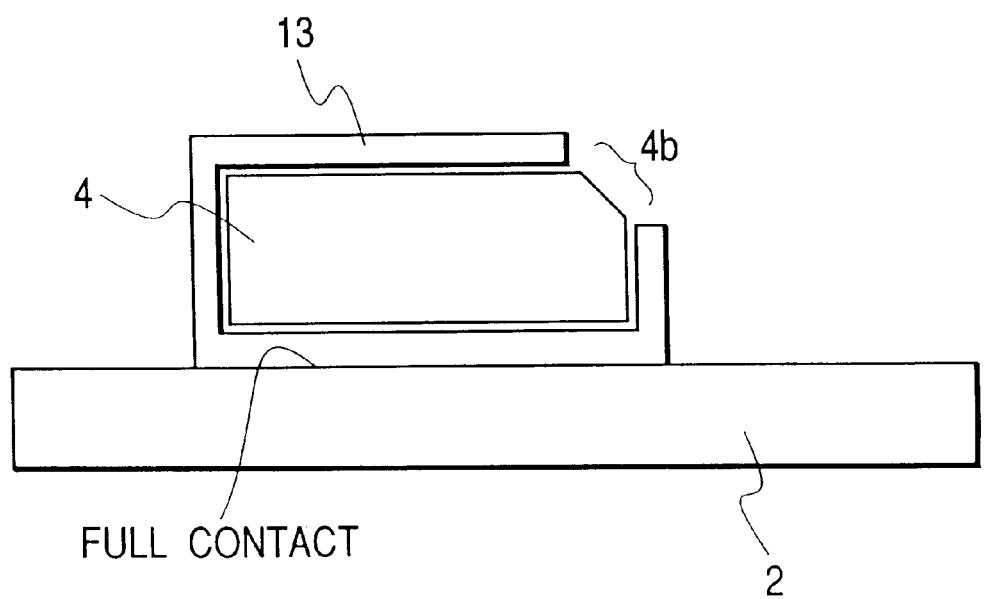
FIG. 8 is a cross sectional view partially showing the structure of an image reading apparatus according to a sixth embodiment of the invention.

FIG. 8 is a cross sectional view partially showing the structure of an image reading apparatus according to the sixth embodiment of the invention.

As shown in FIG. 8, in the sixth embodiment, a light guide frame 13 is provided covering the light guide 4 excepting a light radiation port 4b. Material having a high reflectivity is used for the light guide frame so that light can be efficiently radiated from the light radiation port 4b. In this example, the light guide unit is constituted of a light source 7 (not shown), light guide 4 and light guide frame 13.

Figure 9:
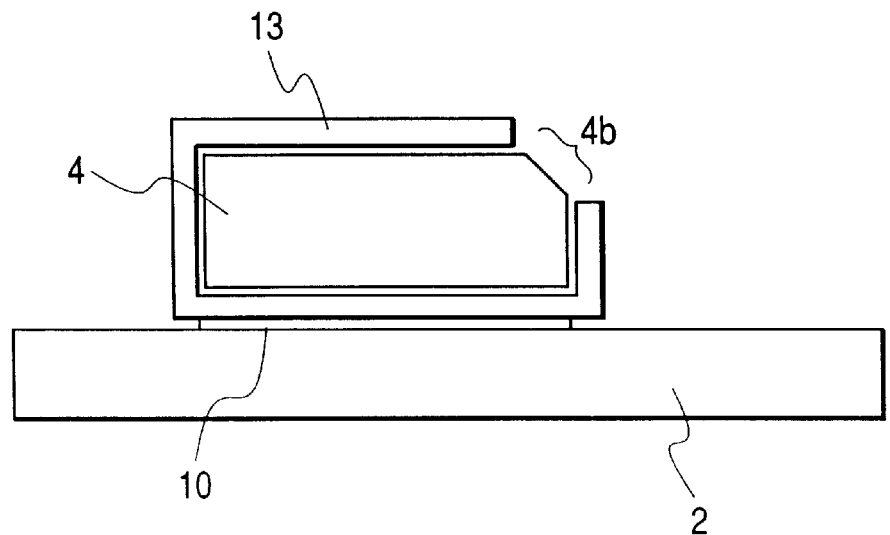
FIG. 9 is a cross sectional view partially showing the structure of an image reading apparatus according to a modification of the sixth embodiment.

In the sixth embodiment shown in FIG. 8, although the light guide frame 13 is made in full and direct contact with the sensor array board, the spacer 10 described with the fourth and fifth embodiments may be used as shown in FIG. 9.

Figure 10:
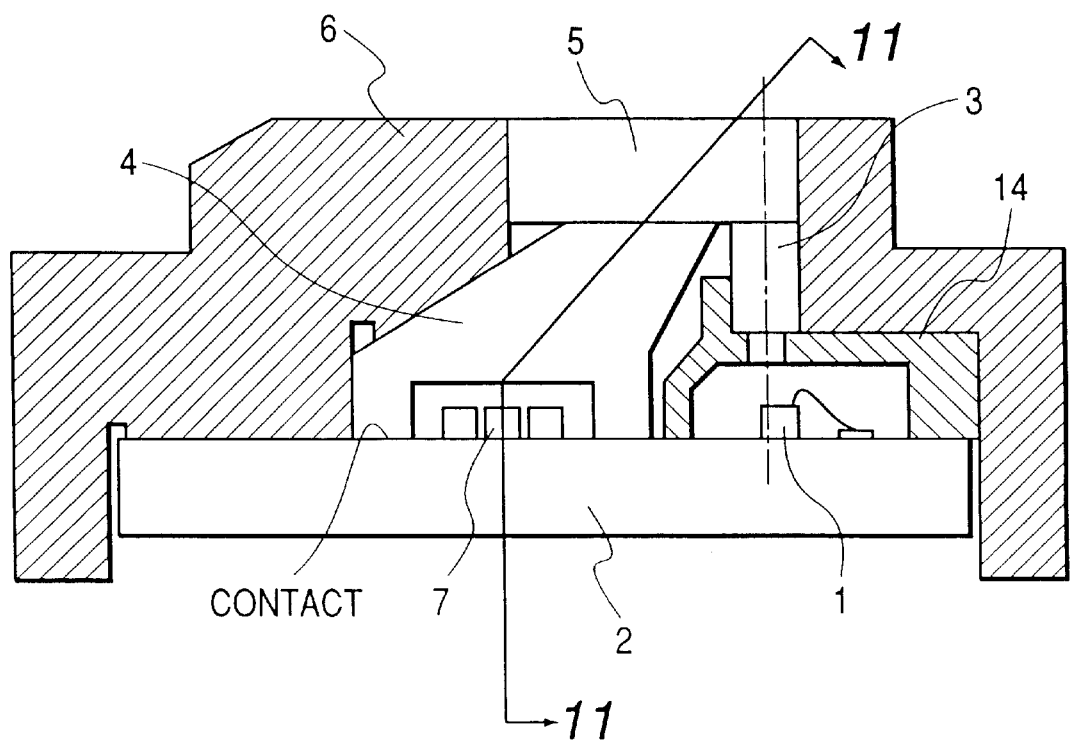
FIG. 10 is a cross sectional view showing the structure of an image reading apparatus according to a seventh embodiment of the invention.
Figure 11:
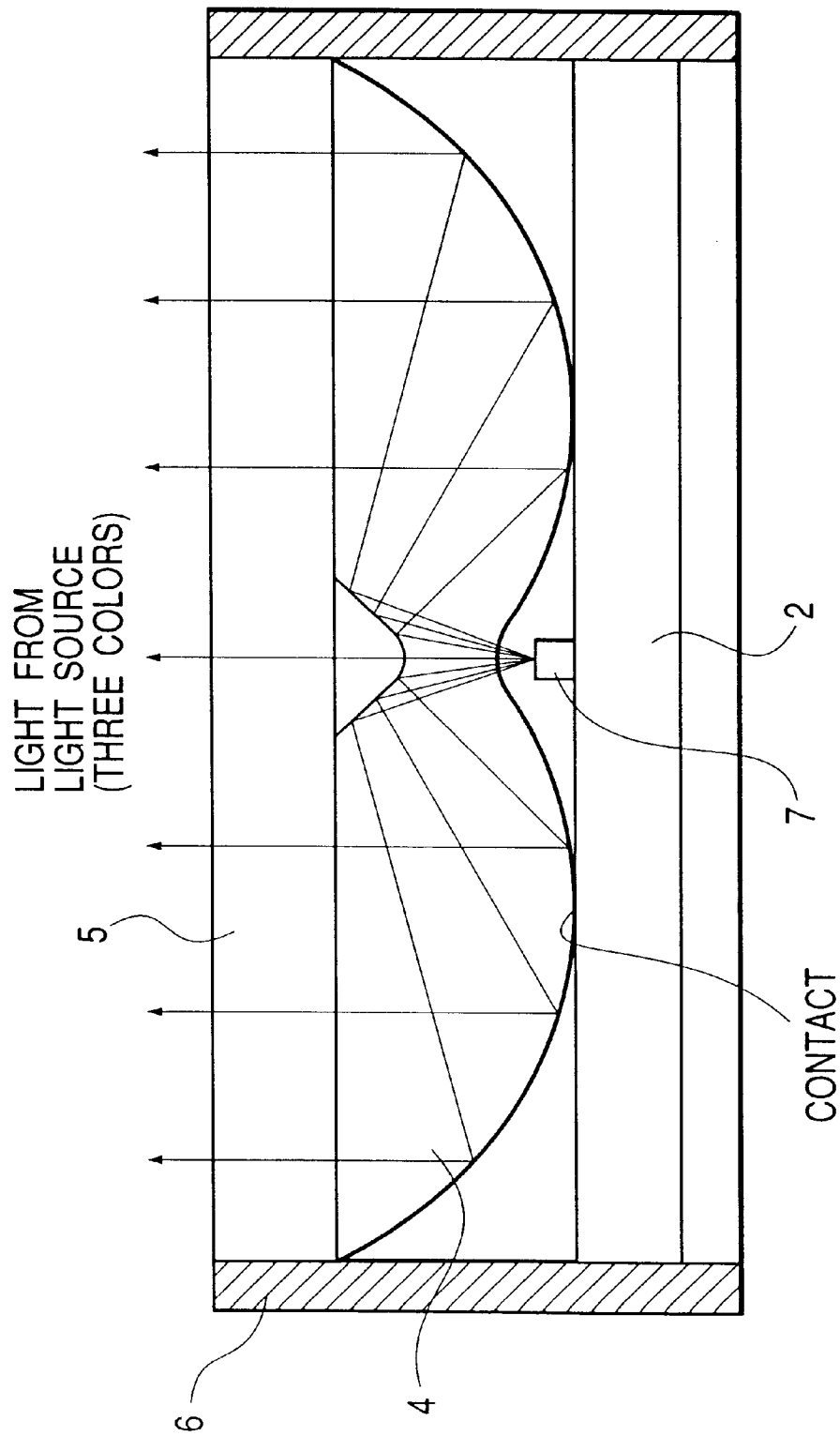
FIG. 11 is a cross sectional view of the image reading apparatus of the seventh embodiment taken along line 11—11 shown in FIG. 10.
Figure 12:
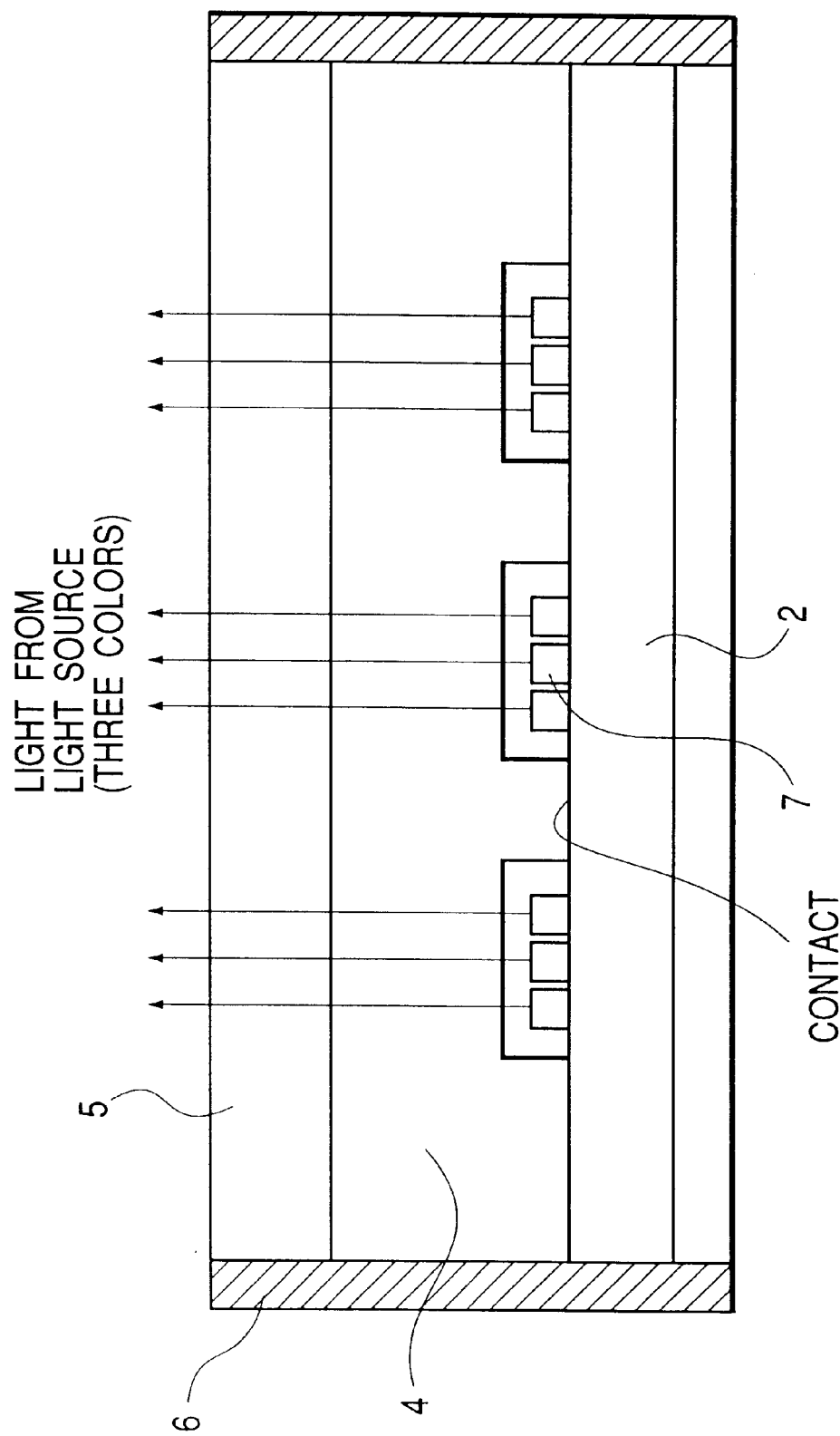
FIG. 12 is a cross sectional view partially showing the structure of an image reading apparatus according to a modification of the seventh embodiment.

FIGS. 10 to 12 are cross sectional views showing the structure of an image reading apparatus according to the seventh embodiment of the invention.

As shown in FIGS. 10 and 11, in the seventh embodiment, the light source 7 constituted of LEDs of three colors R (red), G (green) and B (blue) is mounted on the sensor array board 1.

As shown in FIG. 11, in this embodiment, in order to guide light radiated from the light source 7 mounted on the sensor array board 2, the light guide 4 reflects a portion of the light radiated from the light source 7 and scatters and reflects the remaining portion of the light along a longitudinal direction of the image reading apparatus, and reflects the remaining portion toward the original surface.

FIG. 12 shows a modification of the seventh embodiment in which a plurality of linear light sources are mounted on a line to form light sources 7. Light radiated from each light source 7 is directly applied to the original surface.

Figure 13:
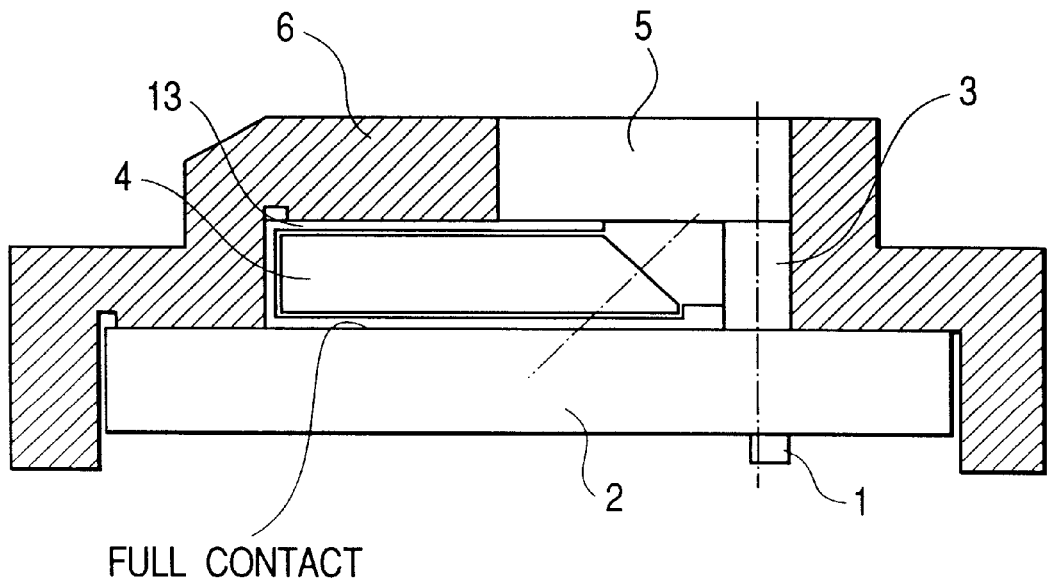
FIG. 13 is a cross sectional view showing the structure of an image reading apparatus according to an eighth embodiment of the invention.
Figure 14:
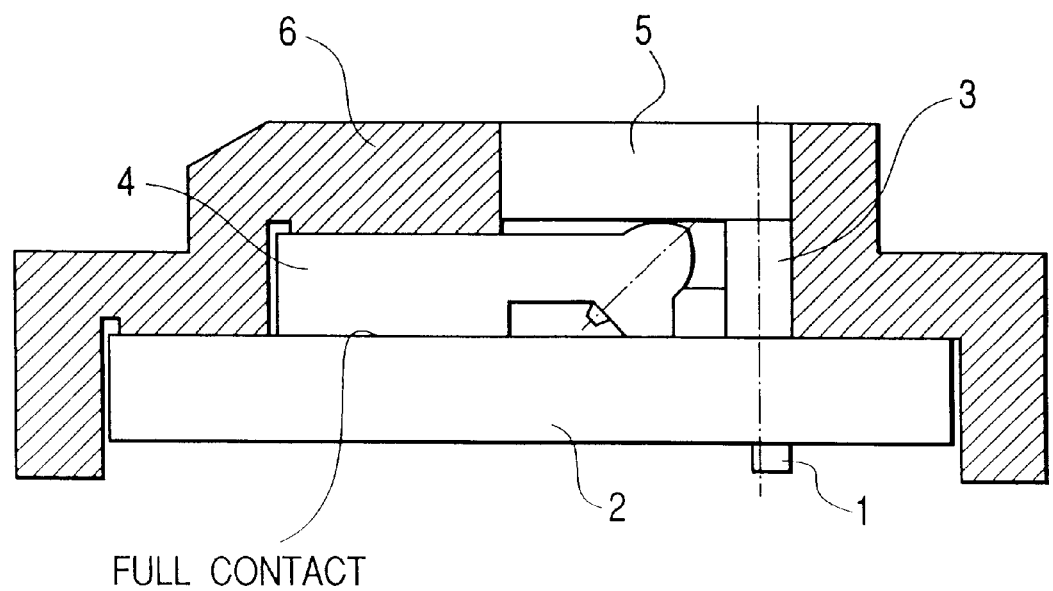
FIG. 14 is a cross sectional view showing the structure of an image reading apparatus according to a modification of the eighth embodiment of the invention.

FIGS. 13 and 14 are cross sectional views showing the structure of an image reading system according to the eighth embodiment of the invention.

As shown in FIGS. 13 and 14, in the eighth embodiment, the sensor array board 2 is a transparent sensor array board, and the sensor array 1 is mounted on the bottom surface of the board 2 opposite to the original side. This structure is disclosed, for example, in Japanese Utility Model Laid-open Application No. 5-20461 (Japanese Utility Model Application No. 3-65645).

In this embodiment, the transparent member 5 and sensor array board 2 can be made to have the same thickness. Therefore, a distance between the sensor array 1 and the focusing element 3 can be made always constant and a high precision apparatus along the focussing direction becomes possible. Furthermore, since dusts can be prevented from being entered during the assembly of the image reading apparatus, a manufacture yield can be improved greatly. Also, since the light guide 4 is mounted on the sensor array board 4 in full contact therewith, the assembly precision of the image reading apparatus can be improved.

In the example shown in FIG. 13, the light guide unit of the sixth embodiment is incorporated, whereas in the example shown in FIG. 14, the light guide unit of the second embodiment is used. It is obvious that other light guide units may also be used.

In the image reading systems shown in FIGS. 13 and 14, it is obvious that the spacer described with the fourth and fifth embodiment may be provided between the sensor array board and the light guide frame or light guide.

Figure 15:
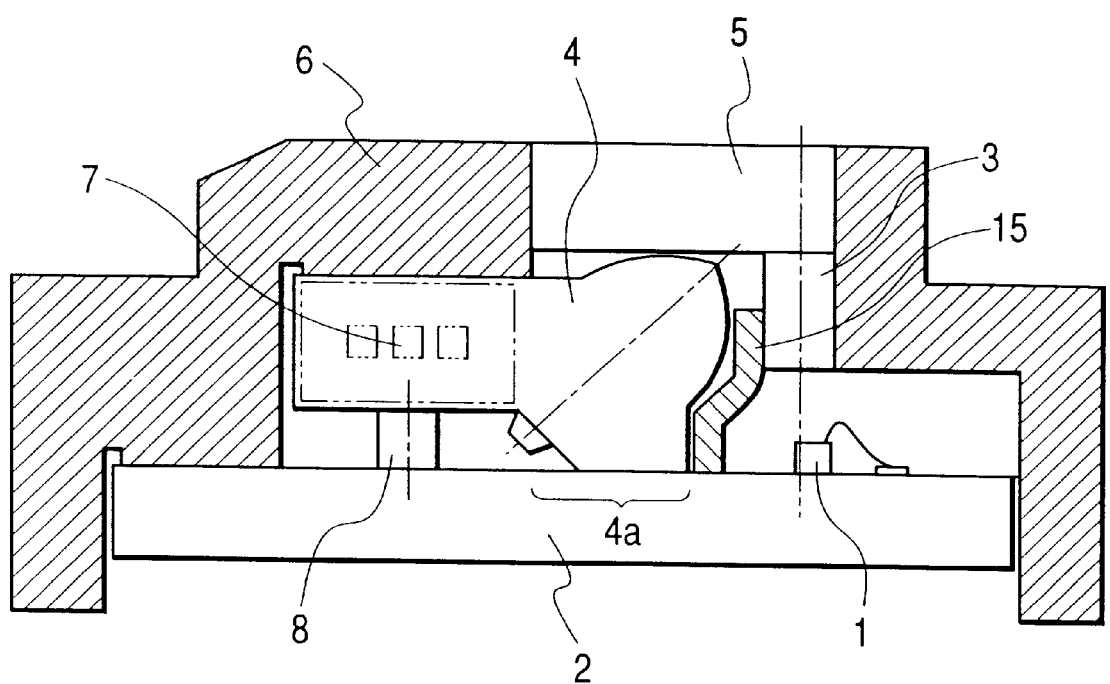
FIG. 15 is a cross sectional view showing the structure of an image reading apparatus according to a ninth embodiment of the invention.

FIG. 15 is a cross sectional view showing the structure of an image reading system according to the ninth embodiment of the invention.

As shown in FIG. 15, in the ninth embodiment, the light shielding member 14 of the first embodiment is replaced by a light shielding member 15. This light shielding member 15 is provided between the light guide 4 and sensor array board 2 in order to prevent light other than image information light from the original surface from entering the sensor array 1. The light shielding member 15 may be made of material which can shield light, such as a black film. In this embodiment, a polyethylene terephthalate (PET) film is used. A black film may be attached to the side face of of the light guide 4. Although the focussing element 3 cannot be fixed by using the light shielding member 15, it may be fixed by attaching adhesive or a tape with both surfaces coated with adhesive to the frame 6.

The embodiments of the image reading apparatus of this invention have been described above. Next, an information processing apparatus using the image reading system of each embodiment will be described with reference to FIG. 16.

Figure 16:
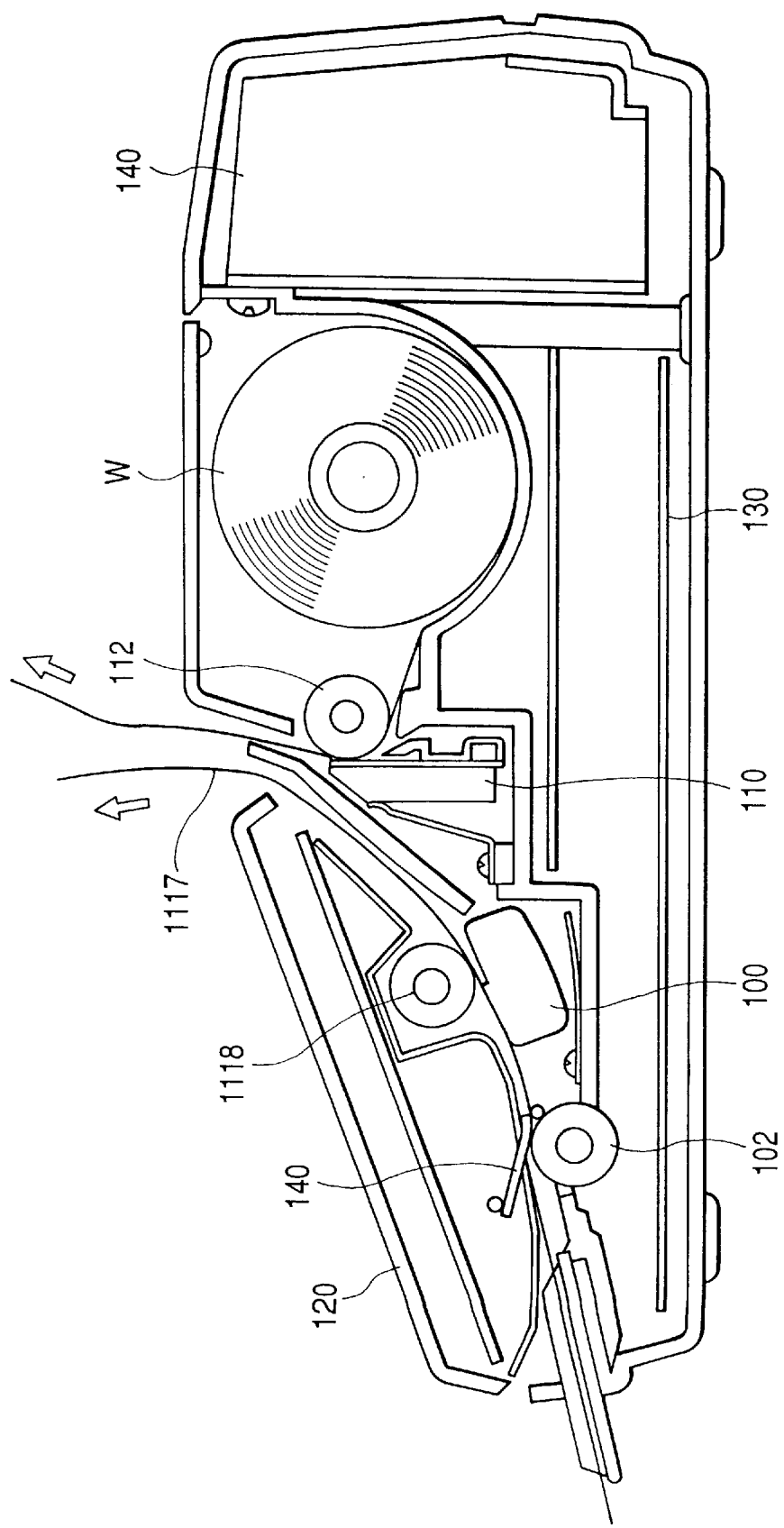
FIG. 16 is a schematic diagram showing an example of an information processing apparatus configured with an image reading apparatus of this invention.

FIG. 16 shows an example of the structure of an information processing apparatus (e.g., facsimile) using the image reading apparatus of this invention.

In FIG. 16, reference numeral 100 represents a photoelectrical conversion unit in which the image reading apparatus of this invention is built. Reference numeral 102 represents a paper feed roller for feeding an original 1117 to a read position, and reference numeral 140 represents a separation blade for reliably separating and feeding each original 1117. Reference numeral 1118 represents a transport roller mounted at the read position of the photoelectrical conversion unit 100 for regulating a read surface of the original 1117 and transporting the original 1117.

Reference character W represents a recording medium in a roll on which image information read with the photoelectrical conversion unit 100, or in the case of a facsimile, image information externally supplied, is formed. Reference numeral 110 represents a recording head for recording an image, which may be a thermal head, an ink jet recording head, or the like. This recording head may be either of a serial type or a line type. Reference numeral 112 represents a platen roller for transporting the recording medium W to the record position of the recording head 110 and regulating the record surface of the recording medium W.

Reference numeral 120 represents an operation panel on which switches for entering operation commands, display units for displaying messages and apparatus statuses, and other units are mounted.

Reference numeral 130 represents a system control board having a driver circuit for a photoelectrical conversion element, a driver circuit for a light source, a processor unit for processing photoelectrically converted image information, a transceiver unit, a control unit for controlling each component of the system, and the like. Reference numeral 140 represents a power source of the apparatus.

The information processing apparatus shown in FIG. 16 may incorporate a thermal transfer recording method or a thermosensitive recording method using a thermal head, or an ink jet recording method using an ink jet recording head.

Examples of the structure using such a recording head as an output means of an output unit of the information processing apparatus will be described. In the following, only the output unit will be described.

Of various ink jet recording methods, a recording head using thermal energy is particularly effective for this invention, because the head itself can be made compact so that the information processing apparatus can have the full advantages of the compact image reading apparatus of the invention.

The typical structure and principle of the output unit are preferable those disclosed in the specifications of U.S. Pat. Nos. 4,723,129 and 4,740,796. These disclosures are applicable to both a so-called on-demand type and a continuous type. Particularly, the on-demand type is suitable because the whole apparatus can be made compact.

This type will be briefly described. At least one drive signal corresponding to record information and giving a rapid temperature rise in excess of nucleate boiling is applied to an electrothermal conversion unit disposed in correspondence with a sheet or liquid path containing liquid (ink). The electrothermal conversion unit therefore generates thermal energy and film boiling is imparted on a thermal reaction surface of the recording head, so that void in one-to-one correspondence with the drive signal is generated in the liquid. Growth or shrink of this void jets out the liquid via an outlet nozzle and forms at least one droplet. If a pulse drive signal is used, it is more preferable because growth and shrink of a liquid can be performed rapidly and properly and the liquid can be jetted out with excellent response characteristics.

The pulse drive signal has preferable a signal shape described in the specifications of U.S. Pat. Nos. 4,463,359 and 4,345,262. More excellent recording becomes possible if the conditions described in the specification of U.S. Pat. No. 4,313,124 are satisfied which describes a temperature rise rate at the thermal reaction surface of a recording head.

The structure of the recording head may be a combined structure of an ejection outlet, a liquid path (inclusive of a linear liquid path and a liquid path with a curved portion) and an electrothermal conversion unit, as disclosed in each of the above-cited specifications, or may be a structure with the thermal reaction surface being disposed at a curved area, as disclosed in the specifications of U.S. Pat. Nos. 4,558,333 and 4,459,600.

It is also effective that the structure of the recording head may be a structure having as an ejection unit a common slit shared by a plurality of electrothermal conversion units, as disclosed in Japanese Patent Laid-open Application No. 59-123670 or a structure having an opening disposed in correspondence with the ejection unit for absorbing a pressure wave of thermal energy, as disclosed in Japanese Patent Laid-open Application No. 59-138461.

A recording head of a full line type may also be used, which has a length corresponding to the maximum width of a recording medium the recording apparatus can handle with. In this case, a combination of a plurality of recording heads described in each of the above-cited specifications or a single integral recording head may be used for covering the maximum width.

It is also preferable to use a recording head of a chip type or a cartridge type. The chip type recording head is removal and can provide an electrical connection to the apparatus main body and an ink supply when it is mounted on the main body. The cartridge type recording head has built-in electrical connection and ink tank.

Recovery means, preliminary and auxiliary means and the like may be added to the recording head of the information processing apparatus of this invention. This is more preferable from the viewpoint of maintenance-free.

More specifically, the recording head may be provided with capping means, cleaning means, pressure or suction means, heating means such as electrothermal conversion unit for heating the recording head, a preliminary ejection mode for performing liquid ejection for the purpose other than recording, these means being effective for stable recording.

A recording mode may be a mode capable of recording with only typical color such as black, or may be a mode of plurality of colors or full color with a single integral recording head or with a plurality of recording heads.

As described so far, according to the image reading apparatus of this invention, the light guide unit is mounted on the board having a photoelectrical conversion element, without using an integral framing body. Therefore, a mount precision of the light guide unit and photoelectrical conversion element does not depend on a precision of the integral framing body and it can be improved further. It is therefore possible to shorten the distance between the light guide unit and photoelectrical conversion element and to make the image reading apparatus compact. Furthermore, the height of the image reading apparatus can be lowered by using a focusing element having a shorter focal length.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   a light guide unit comprising a light source and a longitudinal light transmitting member including a light incidence surface arranged at a longitudinal end of the longitudinal light transmitting member, to which light emitted from said light source is incident, and a light radiation surface from which light is radiated to an image reading surface, said longitudinal light transmitting member for guiding the incident light with reflection thereof from an inner surface of said longitudinal light transmitting member along the longitudinal direction of said light guide unit; and
   a board provided with a photoelectrical conversion element for photoelectrically converting light reflected from the image reading surface into an electrical signal, wherein said light guide unit is contacted with said board to thereby support said light guide unit by said board.

2. An image reading apparatus according to claim 1, further comprising a frame for supporting said light guide unit and said board, wherein at least a portion of said light guide unit is supported by being squeezed by said frame and said board.

3. An image reading apparatus according to claim 2, wherein said light guide unit is formed with a projection for supporting said light guide unit, the projection being in contact with said board.

4. An image reading apparatus according to claim 2, wherein said light guide unit includes a flat surface which is in contact with said board to support said light guide unit.

5. An image reading apparatus according to claim 2, wherein said board is formed with a projection for supporting said light guide unit, said projection being in contact with said light guide unit.

6. An image reading apparatus according to claim 2, wherein said light guide unit includes a light guide for guiding light from the light source to the image reading surface and a light guide frame covering the guide member excepting a light radiation output port.

7. An image reading apparatus according to claim 1, wherein said light guide unit is formed with a projection for supporting said light guide unit, the projection being in contact with said board.

8. An image reading apparatus according to claim 1, wherein said light guide unit includes a flat surface which is in contact with said board to support said light guide unit.

9. An image reading apparatus according to claim 1, wherein said light guide unit is formed with an extruded portion which is fixedly inserted into a recess formed in said board.

10. An image reading apparatus according to claim 1, wherein said board is formed with a projection for supporting said light guide unit, said projection being in contact with said light guide unit.

11. An image reading apparatus according to claim 1, wherein said light guide unit includes a light guide frame covering the guide member excepting a light radiation output port.

12. An image reading apparatus according to claim 1, wherein said light guide unit is mounted on said board via a spacer.

13. An image reading apparatus according to claim 12, wherein the spacer is made of elastic material.

14. An image reading apparatus according to claim 1, wherein said board is a transparent board, and the photoelectrical conversion element is mounted on a surface of the transparent board opposite to the side of said light guide unit.

15. An image reading apparatus according to claim 1, wherein said light guide unit includes the light source and a light guide for guiding light from the light source to the image reading surface, and the light source is mounted on said board.

16. An image reading apparatus according to claim 15, wherein a plurality of light sources are disposed on a line.

17. An apparatus according to claim 1, wherein said light source includes a plurality of light emitting elements.

18. An apparatus according to claim 17, wherein said plurality of light emitting elements include light emitting elements of R, G and B colors.

19. An apparatus according to claim 18, wherein said plurality of light emitting element can be turned on alternately on an each color basis.

20. An apparatus according to claim 19, wherein the light emitting element is a light emitting diode.

21. An apparatus according to claim 18, wherein the light emitting element is a light emitting diode.

22. An apparatus according to claim 17, wherein the light emitting element is a light emitting diode.

23. An apparatus according to claim 1, wherein the light radiation surface of said light guide unit is a lens-shaped surface.

24. An image reading apparatus comprising:
a light guide unit comprising a light source and a longitudinal light transmitting member including a light incidence surface arranged at a longitudinal end of the longitudinal light transmitting member, to which light is emitted from said light source is incident, and a light radiation surface from which light is radiated to an image reading surface, said longitudinal light transmitting member for guiding the incident light with reflection thereof from an inner surface of said longitudinal light transmitting member along the longitudinal direction of said light guide unit; and
a board provided with a photoelectrical conversion element for photoelectrically converting light reflected from the image reading surface into an electrical signal;
a frame for holding said light guide unit and said board; and
a light shielding member for preventing light other than image information light reflected from the image reading surface from entering the photoelectrical conversion element,
wherein said light shielding member is a discrete member different from said frame.

25. An image reading apparatus according to claim 24, wherein said light shielding member is disposed at least between said light guide unit and the photoelectrical conversion element on said board.

26. An apparatus according to claim 24, wherein said light source includes a plurality of light emitting elements.

27. An apparatus according to claim 26, wherein said plurality of light emitting elements include light emitting elements of R, G and B colors.

28. An apparatus according to claim 27, wherein said plurality of light emitting elements can be turned on alternately on an each color basis.

29. An apparatus according to claim 28, wherein the light emitting element is a light emitting diode.

30. An apparatus according to claim 27, wherein the light emitting element is a light emitting diode.

31. An apparatus according to claim 26, wherein the light emitting element is a light emitting diode.

32. An apparatus according to claim 24, wherein the light radiation surface of said light guide unit is a lens-shaped surface.

33. An information processing apparatus, comprising:
an image reader having a light guide unit comprising a light source and a longitudinal light transmitting member, and a board provided with a photoelectrical conversion element for photoelectrically converting light reflected from an original signal, said longitudinal light transmitting member including a light incidence surface arranged at a longitudinal end of the longitudinal light transmitting member, to which light emitted from said light source is incident, and a light radiation surface from which light is radiated to said original image, said light transmitting member for guiding the incident light with reflection thereof from an inner surface of said longitudinal light transmitting member along the longitudinal direction of said light guide unit; and
control means for controlling said image reader,
wherein said light guide unit is in contact with said board to thereby support said light guide unit by said board.

34. An information processing apparatus according to claim 33, further comprising a frame for supporting said light guide unit and said board, wherein at least a portion of said light guide unit is supported by being squeezed by said frame and said board.

35. An information processing apparatus according to claim 34, wherein said light guide unit is formed with a projection for supporting said light guide unit, the projection being in contact with said board.

36. An information processing apparatus according to claim 34, wherein said light guide unit includes a flat surface which is in contact with said board to support said light guide unit.

37. An information processing apparatus according to claim 34, wherein said board is formed with a projection for supporting said light guide unit, said projection being in contact with said light guide unit.

38. An information processing apparatus according to claim 34, wherein said light guide unit includes a light guide frame covering the guide member excepting a light radiation output port.

39. An information processing apparatus according to claim 33, wherein said light guide unit is formed with a projection for supporting said light guide unit, the projection being in contact with said board.

40. An information processing apparatus according to claim 33, wherein said light guide unit includes a flat surface which is in contact with said board to support said light guide unit.

41. An information processing apparatus according to claim 33, wherein said light guide unit is formed with an extruded portion which is fixedly inserted into a recess formed in said board.

42. An information processing apparatus according to claim 33, wherein said board is formed with a projection for supporting said light guide unit, said projection being in contact with said light guide unit.

43. An information processing apparatus according to claim 33, wherein said light guide unit includes a light guide frame covering the guide member excepting a light radiation output port.

44. An information processing apparatus according to claim 33, wherein said light guide unit is mounted on said board via a spacer.

45. An information processing apparatus according to claim 44, wherein the spacer is made of elastic material.

46. An information processing apparatus according to claim 33, wherein said board is a transparent board, and the photoelectrical conversion element is mounted on a surface of the transparent board opposite to the side of said light guide unit.

47. An information processing apparatus according to claim 33, wherein the light source is mounted on said board.

48. An information processing apparatus according to claim 47, wherein a plurality of light sources are disposed on a line.

49. An, apparatus according to claim 33, wherein said light source includes a plurality of light emitting elements.

50. An apparatus according to claim 49, wherein said plurality of light emitting elements include light emitting elements of R, G and B colors.

51. An, apparatus according to claim 50, wherein said plurality of light emitting elements can be turned on alternately on an each color basis.

52. An apparatus according to claim 51, wherein the light emitting element is a light emitting diode.

53. An apparatus according to claim 50, wherein the light emitting element is a light emitting diode.

54. An apparatus according to claim 49, wherein the light emitting element is a light emitting diode.

55. An apparatus according to claim 33, wherein the light radiation surface of said light guide unit is a lens-shaped surface.

56. An information processing apparatus according to claim 33, further comprising drive means for shifting a positional relationship between said original image and said photoelectrical conversion element.

57. An information processing apparatus comprising:

an image reader including a light guide unit comprising a light source and a longitudinal light transmitting member, a board provided with a photoelectrical convrsion element for photoelectrically converting light reflected from an original image into an electrical signal, a frame for holding said light guide unit and said board, and a light shielding member for preventing light other than image information light reflected from said original image from entering the photoelectrical conversion element, said longitudinal light transmitting member including a light incidence surface arranged at a longitudinal end of the longitudinal light transmitting member, to which light emitted from said light source is incident, and a light radiation surface from which light is radiated to said original image, said longitudinal light transmitting member for guiding the incident light with reflection thereof from an inner surface of said longitudinal light transmitting member along the longitudinal direction of said light guide unit; and control means for controlling said image reader, wherein said light shielding member is a discrete member different from said frame.

58. An apparatus according to claim 56, wherein said light source includes a plurality of light emitting elements.

59. An apparatus according to claim 58, wherein said plurality of light emitting elements include light emitting elements of R, G and B colors.

60. An apparatus according to claim 59, wherein said plurality of light emitting elements can be turned on alternately on an each color basis.

61. An apparatus according to claim 60, wherein the light emitting element is a light emitting diode.

62. An apparatus according to claim 59, wherein the light emitting element is a light-emitting diode.

63. An apparatus according to claim 58, wherein the light emitting element is a light emitting diode.

64. An apparatus according to claim 56, wherein the light radiation surface of said light guide unit is a lens-shaped surface.

* * * * *

UNITED STATES PATENT AND TRADEMARK OFFICE
CERTIFICATE OF CORRECTION

PATENT NO. : 6,295,141 B1
DATED : September 25, 2001
INVENTOR(S) : Makoto Ogura et al.

It is certified that error appears in the above-identified patent and that said Letters Patent is hereby corrected as shown below:

Column 4,
Line 54, delete "frame" and insert -- frame 6. --.

Column 11,
Line 51, delete "from an original signal, said" and insert -- from an original image into an electrical signal, said --.

Column 12,
Line 16, delete "light guide frame" and insert -- light guide for guiding light from the light source to the image reading surface and a light guide frame --.

Column 14,
Line 7, delete "claim 56" and insert -- claim 57 --.

Signed and Sealed this

Fifteenth Day of October, 2002

Attest:

Attesting Officer

JAMES E. ROGAN
Director of the United States Patent and Trademark Office